Jan. 15, 1957 F. KOEHLER 2,777,279
RETAINER RING FOR BALANCE WHEEL STAFF
Filed Feb. 8, 1955
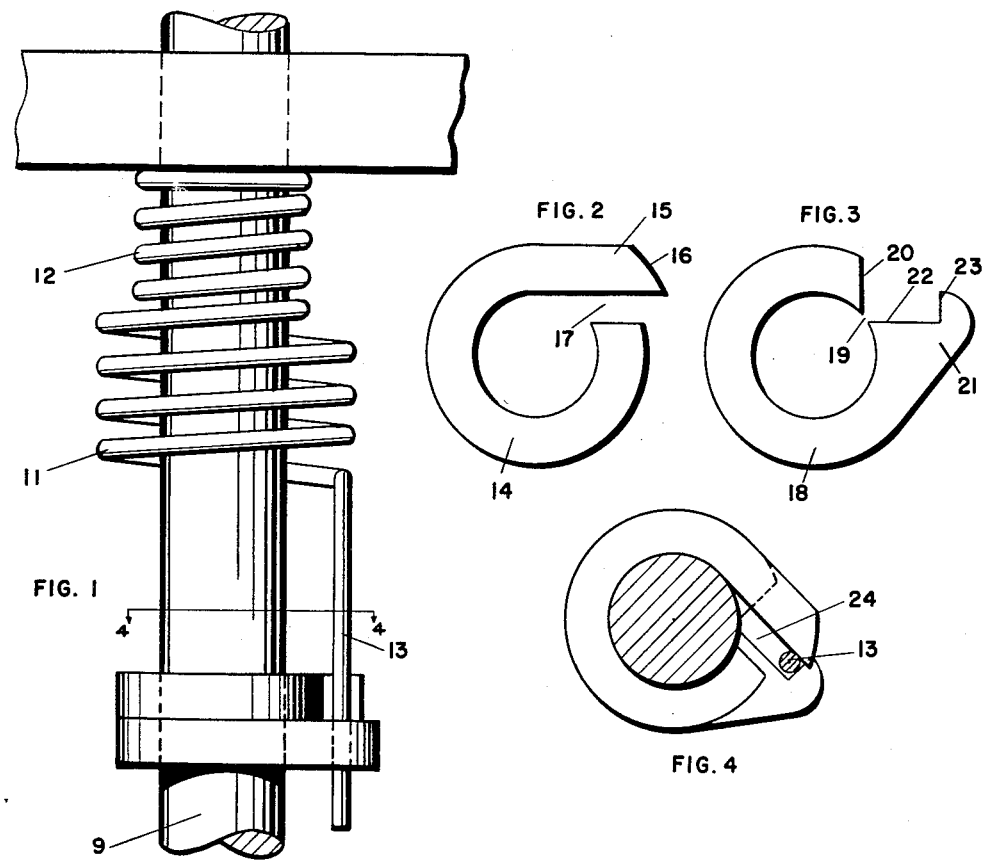
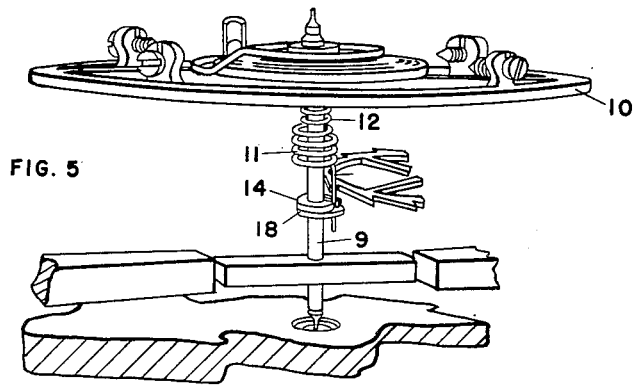
INVENTOR
FRED KOEHLER
BY M.W. Gould
ATTORNEY

United States Patent Office 2,777,279
Patented Jan. 15, 1957

2,777,279
RETAINER RING FOR BALANCE WHEEL STAFF

Fred Koehler, Lancaster, Pa., assignor to Hamilton Watch Company, Lancaster, Pa.

Application February 8, 1955, Serial No. 486,795

1 Claim. (Cl. 58—28)

This invention relates to the mechanism for transmitting power from the balance staff of an electrically driven watch to the indexing gears.

The invention is a specific improvement upon the construction shown in Patent 2,662,366 issued December 15, 1953.

The object of the invention is to improve upon the method of translating the oscillating movement of the balance staff into intermittent rotary motion of the indexing gear.

In Paent 2,662,366 the balance staff was provided with a pair of flanges, difficult to manufacture and hard to secure to the balance staff, which coupled with a coil spring translated the movement of the balance staff to the indexing gear. This particular improvement is directed to replacing the hard to make flanges with a pair of differently shaped spring retainers which are used in pairs, one of the retainers supplementing the other to perform the same operation as the flanges shown in the patent. The coil spring used in the patent is modified so that the application of said spring to the balance staff is made with a saving in labor.

A further object of the invention is to provide a pair of stamped resilient retainers to be applied in pairs to a balance staff and to receive the extended end of the coil spring, and to restrict the end of said spring within prescribed limits in the translation of the oscillatory movement of the balance wheel to the intermittent rotary movement of the indexing gear.

The invenion is shown in the accompanying drawing in which:

Figure 1 is a greatly enlarged front elevation of that portion of the balance staff carrying the coil spring and retainers.

Figure 2 is a top plan of one of the retainers.

Figure 3 is a top plan of the other of the retainers.

Figure 4 is a section on line 4—4 of Figure 1.

Figure 5 is a perspective view of the balance wheel showing the engagement of said wire with said indexing gear.

A balance staff 9 of a balance wheel 10 is identical with the balance wheel and staff shown in Patent 2,662,366. A coil spring 11 having its upper end 12 constricted to tightly engage the balance staff 9 is mounted on the staff directly below the balance wheel 10. The extended end 13 of the spring extends downward parallel to the staff 9. A flat retainer 14 is formed as shown in Figure 2 with an internal diameter slightly smaller than the diameter of the shaft 9 so that when the retainer is applied to the staff it is held by the natural tension of the retainer in place on the staff.

The retainer 14 is formed with a tangential portion 15 extending slightly beyond the outer circumference of the retainer and terminating in a surface 16 which is concentric with the retainer. A split 17 formed between the tangential end and the termination of the washer is sufficient in width to loosely receive the end 13 of the coil spring. A second retainer 18 to be used to supplement the retainer 14 is split at 19, one end terminating in a face 20 which is parallel to a vertical diameter, the other end being enlarged to form an ear 21, a surface 22 which is at right angles to the termination 20. The ear 21 is formed with an abutting surface 23 which is at right angles to the surface 22. It will thus be seen that when the retainer 14 is superimposed over the retainer 18, a restricted area 24 is formed in which the end 13 of the coil spring may move back and forth. By referring to Patent 2,662,366 it will be seen that the area 24 corresponds to the slot 31 which was milled in the annular flanges carried by the balance wheel, this milling was an extremely difficult operation requiring highly skilled labor.

What is claimed is:

In an electric watch having a magnetically impulsed balance staff and a pair of time indicating hands, said watch comprising a coil spring carried by said staff, and having a free end extending along and parallel to said staff, a pair of washers frictionally mounted on said staff, said washers formed to cooperate the one with the other to provide a restricted space to receive the free end of said spring and to limit the movement of said spring within the confines of said space, and an indexing wheel periodically engaged by the free end of said spring, between the last coil of said spring and the washers to transmit the oscillating motion of the balance staff to rotative motion of the hands.

References Cited in the file of this patent
UNITED STATES PATENTS
2,662,366    Koehler _____ Dec. 15, 1953
FOREIGN PATENTS
213,841    Switzerland _____ June 16, 1941